(12) United States Patent
Fagley et al.

(10) Patent No.: US 7,883,810 B2
(45) Date of Patent: Feb. 8, 2011

(54) SLOW PURGE FOR IMPROVED WATER REMOVAL, FREEZE DURABILITY, PURGE ENERGY EFFICIENCY AND VOLTAGE DEGRADATION DUE TO SHUTDOWN/STARTUP CYCLING

(75) Inventors: John C. Fagley, Victor, NY (US); Yan Zhang, Victor, NY (US); Paul Taichiang Yu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 598 days.

(21) Appl. No.: 11/558,090

(22) Filed: Nov. 9, 2006

(65) Prior Publication Data

US 2008/0113240 A1 May 15, 2008

(51) Int. Cl.
*H01M 8/04* (2006.01)
(52) U.S. Cl. ............................ 429/434; 429/512
(58) Field of Classification Search .................. None
See application file for complete search history.

(56) References Cited

U.S. PATENT DOCUMENTS

| | | | |
|---|---|---|---|
| 3,985,578 | A | 10/1976 | Witherspoon et al. |
| 5,272,017 | A | 12/1993 | Swathirajan et al. |
| 5,624,769 | A | 4/1997 | Li et al. |
| 5,723,228 | A * | 3/1998 | Okamoto .................. 429/12 |
| 5,776,624 | A | 7/1998 | Neutzler |
| 6,103,409 | A | 8/2000 | DiPierno Bosco et al. |
| 6,277,513 | B1 | 8/2001 | Swathirajan et al. |
| 6,350,539 | B1 | 2/2002 | Wood, III et al. |
| 6,372,376 | B1 | 4/2002 | Fronk et al. |
| 6,376,111 | B1 | 4/2002 | Mathias et al. |
| 6,521,381 | B1 | 2/2003 | Vyas et al. |
| 6,524,736 | B1 | 2/2003 | Sompalli et al. |
| 6,528,191 | B1 | 3/2003 | Senner |
| 6,566,004 | B1 | 5/2003 | Fly et al. |
| 6,630,260 | B2 | 10/2003 | Forte et al. |
| 6,663,994 | B1 | 12/2003 | Fly et al. |
| 6,740,433 | B2 | 5/2004 | Senner |
| 6,777,120 | B2 | 8/2004 | Nelson |
| 6,793,544 | B2 | 9/2004 | Brady et al. |
| 6,794,068 | B2 | 9/2004 | Rapaport |
| 6,811,918 | B2 | 11/2004 | Blunk |

(Continued)

FOREIGN PATENT DOCUMENTS

EP 1 513 209 A2 9/2005

*Primary Examiner*—John S Maples
(74) *Attorney, Agent, or Firm*—John A. Miller; Miller IP Group, PLC

(57) ABSTRACT

A system for the slow purge of a fuel cell stack. A pump can be used to keep the coolant circulating, so that the stack, an associated radiator, and coolant plumbing therebetween are maintained at the same temperature. The heat from the stack, liquid coolant, and radiator can be used to provide the heat of vaporization of the liquid in the stack, and the liquid water can be removed from the stack as water vapor. Because the air flow rate is relatively low, there is sufficient time for the water to vaporize and for the air to come to the same temperature as the stack, which is also facilitated by high surface area for heat transfer. Purge air can be drawn into the stack through the radiator, via a purge air blower, which preheats the air to help avoid frigid air contacting the stack.

19 Claims, 1 Drawing Sheet

U.S. PATENT DOCUMENTS

| | | |
|---|---|---|
| 6,824,909 B2 | 11/2004 | Mathias |
| 2003/0031902 A1 | 2/2003 | Balasubramanian et al. |
| 2004/0229087 A1 | 11/2004 | Senner et al. |
| 2005/0026012 A1 | 2/2005 | O'Hara |
| 2005/0026018 A1 | 2/2005 | O'Hara et al. |
| 2005/0026523 A1 | 2/2005 | O'Hara et al. |
| 2005/0227126 A1* | 10/2005 | Korytnikov et al. ........... 429/13 |
| 2006/0214469 A1* | 9/2006 | Aase et al. ............... 296/180.5 |

* cited by examiner

SLOW PURGE FOR IMPROVED WATER REMOVAL, FREEZE DURABILITY, PURGE ENERGY EFFICIENCY AND VOLTAGE DEGRADATION DUE TO SHUTDOWN/STARTUP CYCLING

FIELD OF THE INVENTION

The present invention relates generally to fuel cell systems, and more particularly to bipolar plates having enhanced electrochemical stability and water management characteristics.

BACKGROUND OF THE INVENTION

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media (DM) components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

In a conventional PEM fuel cell stack, water is produced in the cell reaction and must be removed from the stack. Conventional technology employs a rapid mechanical purge process. This has several disadvantages, including high energy consumption, and removing water primarily by "mechanical" means, i.e., convecting liquid water out of the stack. Also, this technique may leave significant liquid water under lands which could be contributing to freeze durability problems including damage to the DM and MEA under the lands. Additionally, this technique will give higher than desired carbon corrosion due to elevated relative humidity (RH) from incomplete liquid water removal.

One alternative technique employs a high power purge for about 100-120 seconds. However, this technique requires relatively high energy consumption and is not very effective for removing liquid water, especially under the lands. For example, with the existing 120 second purge the energy consumption is 5 W×120 seconds=600 kJ for a stack with 100 kW gross power. The long duration purge requires an estimated 150 kJ. This long duration strategy requires another energy conversion step (i.e., charging the battery).

Accordingly, there exists a need for new and improved slow purge processes for fuel cell systems so as to provide improved water removal, freeze durability, purge energy efficiency, and/or voltage degradation due to shutdown/startup cycling characteristics.

SUMMARY OF THE INVENTION

In accordance with a first embodiment of the present invention, a purge system for removing water liquid or vapor from a fuel cell stack is provided, comprising: (1) a purge air outlet in fluid communication with the fuel cell stack, wherein the purge air outlet is operable to permit purge air to exit the fuel cell stack; (2) a radiator system in fluid communication with the fuel cell stack; (3) a purge air inlet in fluid communication with the radiator system, wherein the purge air inlet is operable to receive purge air exiting the purge air outlet; and (4) an air blower system in fluid communication with the fuel cell stack and the radiator system, wherein the air blow system is selectively operable to transfer the purge air from the radiator system to the fuel cell stack so as to remove water liquid or vapor therefrom.

In accordance with a first alternative embodiment of the present invention, a purge system for removing water liquid or vapor from a fuel cell stack is provided, comprising: (1) a purge air outlet in fluid communication with the fuel cell stack, wherein the purge air outlet is operable to permit purge air to exit the fuel cell stack; (2) a radiator system in fluid communication with the fuel cell stack; (3) a purge air inlet in fluid communication with the radiator system, wherein the purge air inlet is operable to receive purge air exiting the purge air outlet; (4) an air blower system in fluid communication with the fuel cell stack and the radiator system, wherein the air blow system is selectively operable to transfer the purge air from the radiator system to the fuel cell stack so as to remove water liquid or vapor therefrom; and (5) a pump system in fluid communication with the fuel cell stack and the radiator system, wherein the pump system is operable to selectively pump a coolant through the fuel cell stack and the radiator system.

In accordance with a second alternative embodiment of the present invention, a purge system for removing water liquid or vapor from a fuel cell stack is provided, comprising: (1) a purge air outlet in fluid communication with the fuel cell stack, wherein the purge air outlet is operable to permit purge air to exit the fuel cell stack; (2) a radiator system in fluid communication with the fuel cell stack, wherein the radiator system includes a louver system that is selectively operable to control an airflow through the radiator system; (3) a purge air inlet in fluid communication with the radiator system, wherein the purge air inlet is operable to receive purge air from the outside environment, wherein the radiator system is operable to heat the incoming purge air; (4) an air blower system in fluid communication with the fuel cell stack and the radiator system, wherein the air blow system is selectively operable to transfer the purge air from the radiator system to the fuel cell stack so as to remove water liquid or vapor therefrom; and (5) a pump system including a conduit system in fluid communication with the fuel cell stack and the radiator system, wherein the pump system is operable to selectively pump a coolant through the conduit system, fuel cell stack and the radiator system, wherein the coolant is maintained at substantially the same temperature in the conduit system, fuel cell stack and the radiator system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The FIG. 1 is a schematic illustration of a purge system for a fuel cell system operating in a normal mode, in accordance with the general teachings of the present invention.

DETAILED DESCRIPTION OF THE INVENTION

Figure 1:
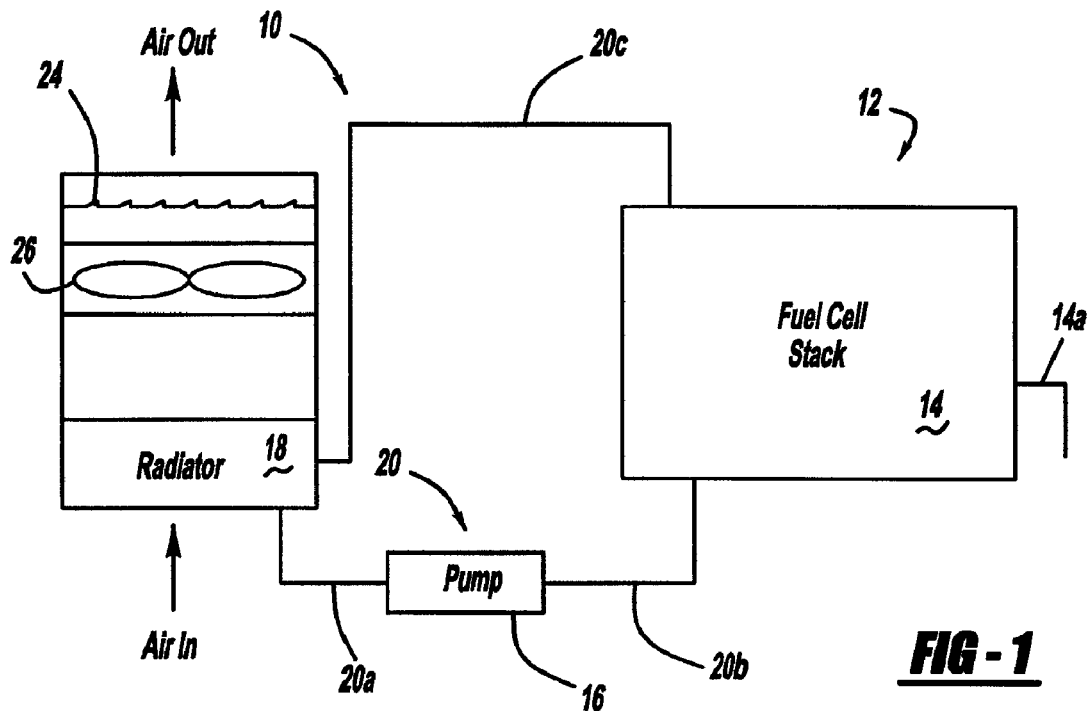
Figure 2:
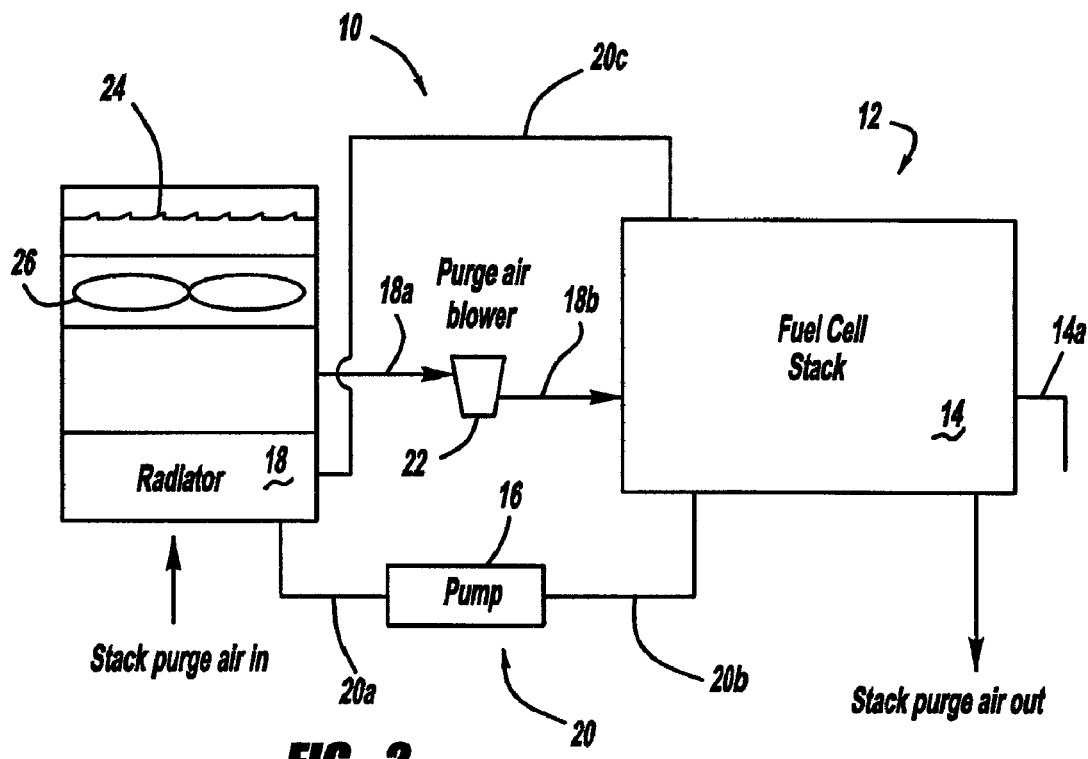
FIG. 2 is a schematic illustration of the purge system for a fuel cell system operating in a purge mode, in accordance with the general teachings of the present invention.

Referring to the FIGS. 1 and 2, there is shown a purge system 10 for use in conjunction with a fuel cell system 12, e.g., a fuel cell stack 14, in accordance with the general teachings of the present invention. For example, an auxiliary low-power liquid coolant pump 16 can be used during this time to keep the coolant circulating, so that the stack 14, radiator 18, and coolant plumbing 20 (e.g., conduit 20a from the radiator 18 to the coolant pump 16, and conduit 20b from the coolant pump 16 to the stack 14) are at the same temperature. The path of coolant flow is generally described as follows. Coolant flows through the pump 16 into the conduit 20a into the radiator 18. From the radiator 18 the coolant will flow into the conduit 20c and be introduced to the fuel cell stack 14. The coolant then exits the fuel cell stack 14, enters conduit 20b and is reintroduced to the pump 16. The heat from the stack 14, the liquid coolant, and the radiator 18 can be used to provide the heat of vaporization of the liquid in the stack 14, and the liquid water can be removed from the stack 14 as water vapor, e.g., out through conduit 14a. Because the air flow rate is relatively low, there is sufficient time for the water to vaporize and for the air to come to the same temperature as the stack 14, which is also facilitated by high surface area for heat transfer.

FIG. 1 depicts the purge system when it is operating in a normal mode. When the purge system 10 is operating in normal mode the radiator 18 will draw in purge air from the ambient environment. The air is then introduced to radiator fan 26 and blown back to the outside environment through louvers 24.

Referring now to FIG. 2, the purge system 10 is shown operating in a purge mode. Purge air can be drawn into the stack 14 through the radiator 18 (e.g., via conduits 18a and 18b), e.g., via a purge air blower 22 which preheats the air to help avoid frigid air contacting the stack 14 at the air inlet. Louvers 24 are now closed to ensure that the air passes through the radiator 18, e.g., by selectively closing and/or opening. When the purge system 10 is operating in purge mode the radiator 18 will draw in purge air from the ambient environment. The air is then introduced to the stack 14 through the conduits 18a and 18b. After the air flows through the stack it exits out to the outside environment. The empty space between the radiator fan 26 and the radiator 18 is not essential, however, it can be used to allow for uniform air flow through the radiator 18.

In accordance with one aspect of the present invention, the stack is purged over a relatively long period of time, e.g., ½ hour to 1 hour. However, it should be appreciated that the purge time can be modified in accordance with the general teachings of the present invention, e.g., the purge time can be less than or greater than the aforementioned purge time interval. In accordance with one aspect of the present invention, the long purge process can be preceded by a relatively short period high intensity purge to "mechanically remove" liquid water accumulated in channels.

Without being bound to a particular theory of the operation of the present invention, it is believed that by using slow vapor-liquid-equilibrium water removal, in lieu of rapid, convective water removal, this type of slow stack purge will remove liquid water from under lands, which will give the membrane a better chance to survive multiple freeze/thaw cycles with minimal or even no degradation.

Several sample calculations were performed to determine, among other things, the time to cool the stack down, the temperature drop of the stack and the coolant for a given amount of water, pressure drop and air flow power, as set fort he below.

With respect to the time to cool the stack down, it is believed that the time to cool the stack down will dictate the purge time. For example, the purge time must be sufficiently short compared to the time required to cool the stack down because it is desirable to have the heat from the stack and coolant system to go toward vaporizing the water, not the heat loss. If it is estimated that a natural convection HTC (heat transfer coefficient) of 10 W/m2-K, given an ambient temperature of 0° C. and an mCp (Mass multiplied by Specific Heat) for the stack and coolant system of 134000 J/K (e.g., from the GM Mainz-Kastel system team), is 6 hours. So the purge must take place in less than 1 hour, so that the heat loss due to cooling will be negligible. It should be noted that heat loss for a real system may be somewhat higher than what is estimated here due to a higher natural convection HTC, or significant heat loss from the coolant plumbing. If that is the case, some minimal additional insulation around the stack and coolant may be required, or a slightly faster purge than the ½ to 1 hour assumed here.

With respect to the temperature drop of the stack and the coolant for a given amount of water, one premise of the present invention is that the sensible heat available in cooling the stack and coolant system is sufficient to vaporize the liquid water accumulated in the stack. For example, consider a stack and coolant system at 60° C. Given a projected mCp of the stack and coolant system of 134000 J/K, the sensible heat available from 60° C. down to 20° C. is 5.36 MJ. Given a heat of vaporization of 2400 J/g, the sensible heat is sufficient to vaporize up to 2230 grams of water. This is an upper limit, because some of the sensible heat will also be required to heat the incoming cold purge air.

On the other hand, it may not be necessary or even desirable to purge all of the liquid water from the stack. In any case, the available data shows liquid water retention of the order of 1050 grams for a full S4.3 stack (400 cells with active area of 360 cm$^2$ per cell) running at 91% RH out prior to shutdown with no purge, and 1600 grams of water for a full S4.3 stack running at 126% outlet RH prior to shutdown with no purge, so the sensible heat is of the right order of magnitude to remove most if not all of the liquid water in the stack for the assumed conditions of 60° C. initial temperature.

For cases where the stack does not reach 60° C., e.g., short duration drives on relatively cold days, other options are available. For example: (1) in many cases a temperature lower than 60° C. may be sufficient, because of a smaller amount of water that may have accumulated during a sort duration drive; (2) an algorithm could be used to estimate the amount of liquid water in the stack, and the required initial temperature for long period purge to work, and the stack could remain on, driving coolant heats, until that temperature is achieved before shutting down; and/or (3) a short period, high flow mechanical purge could be used as a preparation step for long term purge. This would have the double advantage of heating the stack and also removing some of the water mechanically. Once again, an algorithm could be used to determine the required duration of the short term high flow purge. Even in this case, the long period purge offers the advantage of minimizing the length of the high flow purge, and thereby conserving power as well as providing the potential for more thorough drying of the stack.

With respect to the pressure drop and air flow power, e.g., for an S4.3 stack, a 1 kW compressor is typically required to deliver 30 g/sec of air, with a corresponding P drop of 10 kPa. Because the present invention employs the laminar flow regime, pressure drop is proportional to mass flow. For the long duration purge strategy, air flow of the order of 3 g/sec is required. This means that the pressure drop will be of the order of 1 kPa. The following relationship is used to estimate the power required during long duration purge:

$$\text{Power} = a(P_{in} * F_{in})/(1-a)((P_{out}/P_{in})^{((a-1)/a)} - 1$$

wherein a is the ratio of $C_p/C_v$ (e.g., equal to 1.4 for air), wherein $C_p$ is specific heat at constant pressure, $C_v$ is specific heat at constant volume, $P_{in}$ is inlet pressure, $F_{in}$ is inlet volumetric flow rate, and $P_{out}$ is outlet pressure. Using this relationship for comparing the 30 g/sec case at 1 kW with the 6 g/sec case, the required power of the 6 g/sec case is estimated to be 32 W. Even if flow through the radiator and inlet plumbing offers some additional pressure drop, and allowing for a small pump to slowly circulate coolant during the purge, the power consumption should be small, e.g., 40 W or less. If the purge lasts 1 hour, then the total energy required for the purge is only 144 kJ, which could easily be supplied by a relatively small and inexpensive rechargeable battery.

The results from a spreadsheet model provide an analytical solution of a single ordinary differential equation that was written to help determine feasibility of the present invention. The calculations involve solving an energy balance where cold air is brought into the stack heated up to the stack temperature, then leaving the stack fully saturated. The stack loses energy because of heating of the cold incoming air, and also because of evaporation of liquid water. The model also takes into account that, as the stack and therefore the exit air temperature drops, the air will hold less water at saturation. The results of some sample calculations are shown below:

Initial stack T=60° C., purge air flow=6 g/s, incoming air T=-20° C., water removed after ½, 1 and ³⁄₂ hrs=900, 1400 and 1700 grams, respectively, while stack T=42, 35 and 29° C., respectively.

Initial stack T=50° C., purge air flow=6 g/s, incoming air T=-20° C., water removed after ½, 1 and ³⁄₂ hrs=580, 900 and 11600 grams, respectively, while stack T=36, 29 and 23° C., respectively.

In accordance with one aspect of the present invention, instead of one larger radiator fan, a matrix of small fans (e.g., 4 by 4=16) can be used to push or pull air through the radiator during normal operation. Currently, during the prolonged shutdown, only one fan at a time is used to draw air through the radiator and send it into the stack.

In accordance with one aspect of the present invention, a heat exchanger could be used to exchange heat between fresh purge air and exiting purge air, to get more water out of the stack for a given air flow rate. This would require a larger purge blower because of additional pressure drop for the heat exchanger.

In accordance with one aspect of the present invention, the use of more bulky and cheaper materials in radiator would actually facilitate water removal during long duration purge.

In accordance with one aspect of the present invention, because flow rates are relatively low, natural convection could help air purge and recirculation of coolant, which would help reduce rechargeable battery costs. For example, details of the design could encourage natural convection.

If this type of purging is too effective in drying the membrane out in the region near the cathode inlet, then purge shifting could be used in which the purge gas is introduced to the cathode inlet for a specified time period (e.g., 15 seconds) then introduced to the cathode outlet for the same time period. In this way, the membrane would be in contact with fully humidified gas for enough time to keep it in a hydrated state while the liquid water was being removed from the stack.

There are several benefits of the present invention, as set forth below.

More thorough drying of stack by using vapor-liquid equilibrium has the potential to lead to longer freeze durability. Specifically, existing mechanical purge systems will remove water from channels, but will leave significant water under the lands. This, in turn, can eventually lead to degradation of DM and MEA under the lands. The slow purge proposed in the present invention will remove water from under the lands, which may ultimately prove to be the key for durability with numerous freeze cycles.

Because air flow rate is relatively low (e.g., the stack is purged over period of ½ to 2 hours), the pressure drop of air through the stack is very low, e.g. less than 1 kPa. As a result, the energy required to pump this amount of air is also very low.

With the purge strategy of the present invention, it is now possible to remove more liquid water from the stack, which opens up the possibility of operating at higher RH outlet conditions, which could further improve stack durability as well as the range of acceptable operation.

The present invention has the advantage of mitigating carbon corrosion during shutdown/startup cycling. With the slow purge strategy, the membrane water content is lowered and the stack is cooled down prior to purging the anode side with air. These two factors will strongly improve the voltage degradation during system shutdown and startup cycling. The former reduces the water content in the ionomer which will serve to slow the carbon corrosion reaction in the cathode, because water is one of the reactants. The less the water contents in the ionomer, the slower the carbon corrosion reaction rate. The latter would improve the voltage degradation when the air/$H_2$ front passes through the anode during fuel cell system shutdown and startup, because the lower the temperature of the passages of air/$H_2$ front in the anode, the lower the voltage degradation rate during the shutdown/startup cycling.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A purge system for removing water liquid or vapor from a fuel cell stack, comprising:
    a purge air outlet in fluid communication with the fuel cell stack, wherein the purge air outlet is operable to permit purge air to exit the fuel cell stack;
    a radiator in fluid communication with the fuel cell stack and receiving a coolant from the fuel cell stack to be cooled;
    a purge air inlet in fluid communication with the radiator, wherein the purge air inlet is operable to receive purge air from the outside environment; and
    an air blower system in fluid communication with the fuel cell stack and the radiator, wherein the air blower system is selectively operable to transfer the purge air from the radiator to the fuel cell stack so as to remove water liquid or vapor therefrom.

2. The invention according to claim 1, further comprising a pump system in fluid communication with the fuel cell stack and the radiator system, wherein the pump system is operable to selectively pump a coolant through the fuel cell stack and the radiator system.

3. The invention according to claim 2, wherein the pump system includes a conduit system in fluid communication with the fuel cell stack and the radiator, wherein the pump system is operable to selectively pump a coolant through the conduit system, wherein the coolant is maintained at substantially the same temperature in the conduit system, fuel cell stack and the radiator.

4. The invention according to claim 1, wherein the radiator includes a louver system that is selectively operable to control an airflow through the radiator system.

5. The invention according to claim 1, wherein the radiator is operable to heat the incoming purge air.

6. The invention according to claim 1, wherein the purge system is operated for a time period of about 30 minutes to about 120 minutes.

7. The invention according to claim 1, wherein the purge system is operated for a time period of about 30 minutes to about 60 minutes.

8. The invention according to claim 1, wherein the power needed to operate the purge system is calculated according to the formula $P=a \ (P_{in}*F_{in})/(1-a)P_{out}/P_{in})^{((a-1)/a-1)}$, wherein P is power, a is the ratio of $C_p/C_v$, wherein $C_p$ is specific heat at constant pressure, $C_v$ is specific heat at constant volume, $P_{in}$ is inlet pressure, $F_{in}$ is inlet volumetric flow rate, and $P_{out}$ is outlet pressure.

9. A purge system for removing water liquid or vapor from a fuel cell stack, comprising:
    a purge air outlet in fluid communication with the fuel cell stack, wherein the purge air outlet is operable to permit purge air to exit the fuel cell stack;
    a radiator in fluid communication with the fuel cell stack;
    a purge air inlet in fluid communication with the radiator, wherein the purge air inlet is operable to receive purge air exiting the purge air outlet;
    an air blower system in fluid communication with the fuel cell stack and the radiator, wherein the air blower system is selectively operable to transfer the purge air from the radiator to the fuel cell stack so as to remove water liquid or vapor therefrom; and
    a pump system in fluid communication with the fuel cell stack and the radiator, wherein the pump system is operable to selectively pump a coolant through the fuel cell stack and the radiator.

10. The invention according to claim 9, wherein the pump system includes a conduit system in fluid communication with the fuel cell stack and the radiator, wherein the pump system is operable to selectively pump a coolant through the conduit system, wherein the coolant is maintained at substantially the same temperature in the conduit system, fuel cell stack and the radiator system.

11. The invention according to claim 9, wherein the radiator system includes a louver system that is selectively operable to control an airflow through the radiator.

12. The invention according to claim 9, wherein the radiator is operable to heat the incoming purge air.

13. The invention according to claim 9, wherein the purge system is operated for a time period of about 30 minutes to about 120 minutes.

14. The invention according to claim 9, wherein the purge system is operated for a time period of about 30 minutes to about 60 minutes.

15. The invention according to claim 9, wherein the power needed to operate the purge system is calculated according to the formula $P=a \ (P_{in}*F_{in})/(1-a)((P_{out}/P_{in})^{((a-1)/a-1)}$, wherein P is power, a is the ratio of $C_p/C_v$, wherein $C_p$ is specific heat at constant pressure, $C_v$ is specific heat at constant volume, $P_{in}$ is inlet pressure, $F_{in}$ is inlet volumetric flow rate, and $P_{out}$ is outlet pressure.

16. A purge system for removing water liquid or vapor from a fuel cell stack, comprising:
    a purge air outlet in fluid communication with the fuel cell stack, wherein the purge air outlet is operable to permit purge air to exit the fuel cell stack;
    a radiator in fluid communication with the fuel cell stack, wherein the radiator includes a louver system that is selectively operable to control an airflow through the radiator;
    a purge air inlet in fluid communication with the radiator, wherein the purge air inlet is operable to receive purge air exiting the purge air outlet, wherein the radiator is operable to heat the incoming purge air;
    an air blower system in fluid communication with the fuel cell stack and the radiator, wherein the air blower system is selectively operable to transfer the purge air from the radiator system to the fuel cell stack so as to remove water liquid or vapor therefrom; and
    a pump system including a conduit system in fluid communication with the fuel cell stack and the radiator, wherein the pump system is operable to selectively pump a coolant through the conduit system, fuel cell stack and the radiator, wherein the coolant is maintained at substantially the same temperature in the conduit system, fuel cell stack and the radiator.

17. The invention according to claim 16, wherein the purge system is operated for a time period of about 30 minutes to about 120 minutes.

18. The invention according to claim 16, wherein the purge system is operated for a time period of about 30 minutes to about 60 minutes.

19. The invention according to claim 18, wherein the power needed to operate the purge system is calculated according to the formula $P=a(P_{in}*F_{in})/(1-a)((P_{out}/P_{in})^{((a-1)/a}-1)$, wherein P is power, a is the ratio of $C_p/C_v$, wherein $C_p$ is specific heat at constant pressure, is specific heat at constant volume, $P_{in}$ is inlet pressure, $F_{in}$ is inlet volumetric flow rate, and $P_{out}$ is outlet pressure.

* * * * *